N. D. POWELL.
DIVIDED STUD LINK.
APPLICATION FILED MAR. 14, 1918.
1,358,108.
Patented Nov. 9, 1920.
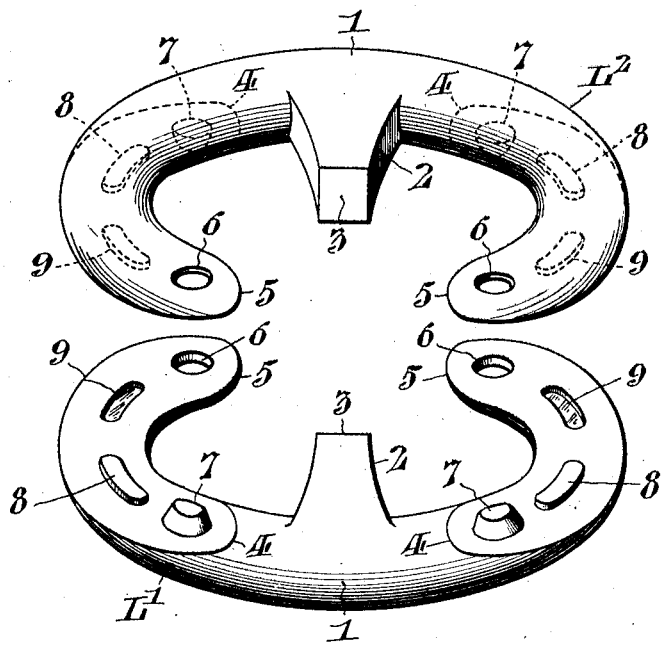
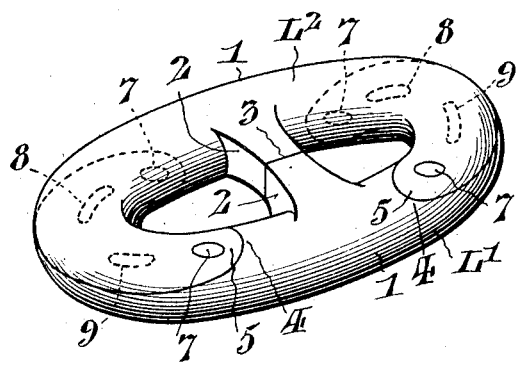
INVENTOR
Norris D. Powell
by Cornelius D. Ehret
his ATTORNEY

UNITED STATES PATENT OFFICE.

NORRIS D. POWELL, OF CHESTER, PENNSYLVANIA, ASSIGNOR TO BALDT ANCHOR COMPANY, OF CHESTER, PENNSYLVANIA, A CORPORATION OF NEW JERSEY.

DIVIDED STUD-LINK.

1,358,108.  Specification of Letters Patent.  Patented Nov. 9, 1920.

Application filed March 14, 1918. Serial No. 222,301.

*To all whom it may concern:*

Be it known that I, NORRIS D. POWELL, a citizen of the United States, residing in the city of Chester, county of Delaware, and State of Pennsylvania, have invented a new and useful Divided Stud-Link, of which the following is a specification.

My invention relates to chains and particularly heavy chains such as used for ship anchors or other heavy duty.

My invention resides in a link of which the chain is constituted comprising two parts which may be assembled to form a link, the link elements having in addition to lugs riveted or otherwise secured in holes in the companion elements, registering lugs and holes or sockets for preventing relative movement of the link elements upon each other, and each link element having preferably a central transversely extending lug abutting a similar lug on the complementary element, the abutting lugs on the two elements forming the stud of the complete stud link.

For an illustration of one of the various forms my invention may take, reference is to be had to the accompanying drawing, in which:

Figure 1 is a perspective view of the link elements.

Fig. 2 is a perspective view of the assembled link.

Referring to the drawing, it will be seen that each link comprises similar link elements $L^1$ and $L^2$ preferably consisting of a forging of steel or iron, each link element being circumferentially incomplete, but each having a side 1 having the integral lug or stud element 2 having the face or abutting surface 3. At each end of the link element it is tapered from full thickness of the side portion 1 at 4 to the free end 5 of lesser thickness. Near each end 5 is a hole 6 adapted to receive the elongated tapered lug 7. And suitably spaced from each lug 7 is an elongated lug 8 adapted to register or engage in the depression or hole 9 of the companion element, the hole 9 preferably extending only part way through the link element. The link elements may be forged of steel or other suitable material as in a die, whereby all are similarly sized and proportioned. The link is assembled by placing the element $L^2$ upon the element $L^1$, the lugs 7, 7 on the element $L^1$ projecting through the holes 6, 6 in the companion element $L^2$. These holes 6, 6 are countersunk or flared at the outer surface of the link element and the lugs 7, 7 then riveted over. The lugs 8, 8 on element $L^1$ engage in the depressions or holes 9, 9 in the element $L^2$ and resist any twisting or movement of one link element upon the other. Similarly, the lugs 7, 7 and 8, 8 of the element $L^2$ engage in the holes 6, 6 and 9, 9 in the element $L^1$, the holes 6, 6 in the element $L^1$ being countersunk on their outer sides and the lugs 7, 7 of the element $L^2$ riveted over. With the parts in this assembled position the faces 3 of the stud elements 2 abut each other as indicated in Fig. 2. These stud elements therefore constitute a stud for the finished link, and the stud structure is in effect a divided stud, part of the stud being on each link element. Though it is obvious that one stud element 2 may be longer than the other, it is preferred that they be of substantially equal lengths as indicated.

It will be understood that a chain of any desired length is made up of links of the character described, the link elements $L^1$ and $L^2$ being hooked or passed through neighboring links before they are secured together.

What I claim is:

A stud link comprising a pair of link elements, each circumferentially incomplete, the link elements being mounted in overlapping arrangement and each having an inwardly directed stud intermediate its ends with a flat end face at right angles to the length of the stud and abutting squarely the flat end face of the stud of the overlapping companion link element each link element having a flared hole in each end and a recess and a pair of spaced lugs on its inner face between each end and the respective stud, the innermost lugs of each pair of link elements being tapered and fitting the flared holes of the companion link element and adapted to enable the link elements to be drawn together in rigid relation without affecting the square abutment of the intermediate studs and riveted in the said flared holes, and the remaining lugs fitting in the respective recesses and preventing relative displacement of the link elements laterally and longitudinally of the stud link.

In testimony whereof I have hereunto affixed my signature this 13" day of March, 1918.

NORRIS D. POWELL.